DIFFERENTIAL FLUID AMPLIFIER

Filed Sept. 28, 1962 2 Sheets-Sheet 1

INVENTOR
FRANCIS M. MANION
BY Hurvitz + Rose
ATTORNEYS

INVENTOR
FRANCIS M. MANION

BY Hurvitz + Rose
ATTORNEYS

United States Patent Office 3,209,774

Patented Oct. 5, 1965

3,209,774

DIFFERENTIAL FLUID AMPLIFIER

Francis M. Manion, Rockville, Md., assignor to Bowles Engineering Corporation, Silver Spring, Md., a corporation of Maryland Filed Sept. 28, 1962, Ser. No. 226,856
10 Claims. (Cl. 137—81.5)

Figure 1:
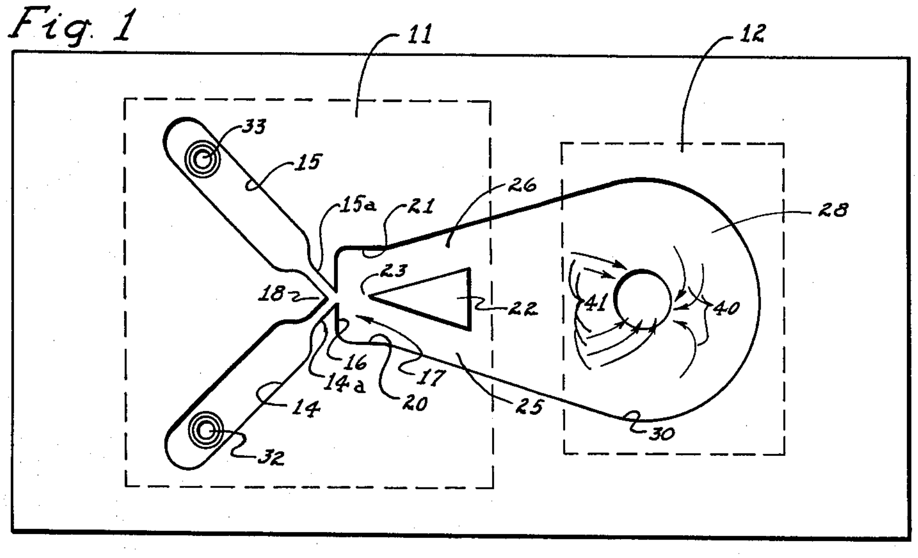

This invention relates generally to pure fluid amplifier systems and more specifically to a differential fluid amplifier for comparing and velocity-amplifying pressure differentials between fluid input signals and for converting the velocity-amplified signals to fluid output signals which can be employed to drive load utilization devices utilizing fluid vortex flow for the control or operation thereof.

In general, the comparison of pressure differentials between analog-type, fluid input signals can be most readily achieved by a fluid comparator. Basically, a comparator is a logic component which effectively compares the instantaneous magnitudes of a fluctuating signal to that of an essentially non-fluctuating signal and produces an output signal corresponding to the differentials in magnitude that instantaneously exist between the two signals.

As contemplated in the present invention, a typical fluid comparator comprises a plurality of angularly disposed nozzles having the outlet orifices thereof extending through an end wall of an interaction chamber. The nozzles are positioned at an angle relative to one another such that fluid jets issuing therefrom and having at least a predetermined minimum pressure for which the unit is designed intercept one another in the interaction chamber. The interacting streams combine to form a single fluid stream having a directivity determined by the relative momenta of the interacting streams. The momentum of a stream depends upon the size and speed of the stream and upon the density, viscosity, compressibility and other properties of the fluids involved. For purposes of simplicity of explanation, it will be assumed that the size of the two interacting streams and the fluid applied to both nozzles are the same. It is to be understood, however, that any one or more of these properties may be varied in order to impart predetermined characteristics to the apparatus. In a system where the nozzle sizes are equal and the fluids are the same, then equal pressures applied to the fluids supplied to the two nozzles produce streams of equal mass flows and equal energies. Therefore, a null in such a system indicates an equality of the three basic parameters of fluid flow. If it is desired, however, to separate the effect of these three parameters and detect a null in only one of them; for instance, mass flow, then differences must be developed in the streams. As an easily explained example, the size of one of the nozzles may be made larger than the other. Under this condition, when the pressures of the fluid applied to the two nozzles are equal, the velocities of the streams are equal but their mass flows, and therefore momentums, are unequal. Since direction of the combined streams is a function of relative momentums of the streams, the combined streams in this case are displaced from the center or null condition. In order to produce a null, the pressure of the fluid applied to the small cross-section nozzle must be increased so as to increase its mass flow and velocity. Energy of a stream is a function of both mass flow and pressure and therefore streams with equal energies produce a different directivity of the combined stream from either of the other two parameters. Thus, by proper calibration of a device one may determine distinct nulls for each of the parameters of the stream. Also, the above technique provides a weighted comparator in that the pressure of one supply to a nozzle must exceed the pressure of the other supply by a fixed amount before a null is obtained.

The interaction chamber is defined in a typical case by an end wall and two outwardly diverging side walls hereinafter referred to as the left and right side walls. In the present invention, the detailed contours of the side walls of the chamber in which the streams interact are of secondary importance to the interacting forces between the streams themselves. Although the side walls can be used to confine the fluid to the interacting chamber and thus make it possible to have the streams interact in a region at some desired pressure, the side walls are preferably positioned so that they are remote from the high velocity portions of the interacting streams. Thus, the interaction between the streams and consequently the final direction of the combined streams is a function of the relative momentums of the two streams with the sidewalls having little effect on the results of the interaction.

A V-shaped divider is disposed at a predetermined distance from the end wall with the apex of the divider disposed along the center line between the orifices of the nozzles, the sides of the divider being generally parallel to the left and right side walls of the chamber. The regions between the sides of the divider and the left and right side walls define left and right output passages, respectively.

With regard to the aforementioned nozzles, the left nozzle of the pair is positioned with respect to the divider and the interaction chamber so that it discharges all or essentially all of its stream into the right passage, the right nozzle being correspondingly positioned to discharge all or essentially all of its stream into the left passage, the nozzles having substantially equal cross-sectional areas. When the differential in pressure between the interacting streams is zero or substantially zero, the momentum of the streams is equal and a combined stream is formed which is at equal angles with both nozzles. The stream is consequently bisected by the apex of the divider and the fluid divides equally between the two outlet passages.

To effect pressure comparison, fluid at some predetermined pressure is supplied, for example, to the left nozzle and a well-defined stream issues from that nozzle into the interaction chamber. All, or substantially all of this fluid is directed into the right output passage. Input fluid signals which may take the form of fluctuations of pressure, either decreasing or increasing, are supplied to the right nozzle and these signals produce deflection of the stream issuing from the left nozzle to a degree dependent upon relative momenta of the input signal discharging from the right nozzle and the standard or reference signal discharging from the left nozzle. Thus, the combined stream is caused to move across the apex of the divider as a function of stream momenta and the relative proportions of fluid entering the two outlet passages are varied correspondingly. An indication of the difference in stream momenta may then be measured by determining the difference in fluid flows in the two outlet passages.

The stream interaction upon which the functioning of this type of comparator depends results in pressure and velocity losses and thus, it is often necessary or desirable to amplify the output fluid signal from the comparator before the signal is supplied to a utilization device. Such an amplifier, however, should preserve the differential nature of the output signals; that is, the amplifier should also be of the differential type.

Another important consideration in the design of any system for comparing a monitored signal with a reference signal is the hysteresis characteristic of the system. Since it is generally necessary that the response time and percentage change of signal required to produce switching of output channels is minimal, systems having low hysteresis characteristics are most desirable.

In achieving the objectives of signal comparison, amplification and preservation of the differential nature of the fluid output signals, the present invention contemplates having the output passages of a fluid pressure comparator coupled directly to a vortex-type fluid amplifier. A fluid vortex amplifier utilizes the flow of fluid, fluid characteristics, and fluid flow characteristics to amplify an input signal and does not require moving parts other than the moving fluid itself.

In order to understand the operation of this type of amplifier assume that a circular pan of liquid is provided with a small discharge orifice at the bottom center. The height of liquid in the pan results in a hydrostatic head or pressure which tends to force the fluid out of the small, centrally located discharge orifice. In the case of non-rotating flow the fluid will flow radially toward and through the orifice. For an incompressible fluid, the flow velocity will be inversely related to the liquid radial location. If one considers a two-dimensional, non-rotating flow condition, as for example, in the case of flow to a conventional sink, the radial velocity $V_r$ and the radial position $r$ will be related as in equation 1

$$V_r=\frac{\text{constant}}{r} \quad (1)$$

If the fluid is compressible then the local fluid density $\rho$ must be considered and Equation 1 becomes $$V_r=\frac{\text{constant}}{r\rho} \quad (2)$$

If a tangential component of velocity is imparted to the fluid immediately adjacent to the pan rim, a fluid annulus rotates as a whole about the discharge hole as an axis, and the flow is now rotating rather than non-rotating. It has been shown mathematically in text books on the subject that as this annulus shrinks toward the centrally located outlet, the tangential velocity component $V_t$ for simple rotating flow is related to the radial position by Equation 3

$$V_t=\frac{\text{constant}}{r} \quad (3)$$

Consequently, when the fluid is discharging from the pan, as fluid moves from the rim toward the centrally located discharge orifice, its tangential velocity component $V_t$ increases as the radial position decreases. Ideally, if one start with a 10″ diameter pan discharging through a centrally located orifice of .01″ diameter the tangential velocity component at the discharge orifice $V_{td}$ would be one thousand times the tangential velocity component at the rim of the pan $V_{tc}$. Thus, the tangential velocity component is amplified.

While an open pan of liquid has been used to describe in elementary fashion the operation of a vortex amplifier, the present invention employs an enclosed vortex chamber. The vortex chamber is formed integrally with the fluid comparator and more particularly, is located downstream of the divider of the comparator. The egress or outlet orifice of the vortex unit is located along the same center line of the unit as the apex of the divider so that the vortex chamber is fed tangentially but in opposite directions from the two outlet orifices of the comparator. If the fluid flows in the two outlet passages of the comparator are equal, the effects of these two flows counterbalance one another and the flow to the outlet orifice of the vortex chamber is non-rotating. If the flow in one outlet passage of the comparator is greater a net rotating velocity is developed which is a direct function of which flow is larger and how much larger. This net tangential velocity is amplified by the vortex action in the vortex chamber so that the output signal from the egress port is an amplified function of the differential signal produced by the comparator.

The advantages of the vortex amplifier in this system are low hysteresis, no moving parts and a small compact unit directly incorporated in the same physical structure as the comparator. As will be pointed out in detail later, the hysteresis effects are a function of the diameter of the egress port of the vortex amplifier.

It is an object of this invention to provide a differential fluid amplifier having no moving parts.

More specifically, it is an object of this invention to provide a fluid amplifier of the type described for comparing the pressure differentials between analog fluid input signals and velocity-amplifying the differential output signals produced by the comparison.

Another object of this invention is to provide a fluid amplifier having a low hysteresis characteristic which may be varied, as desired, to meet the requirements of the utilization device to which the amplifier is connected.

Still another object of this invention is to provide a fluid amplifier in accordance with the above objects which lends itself to ease of manufacture.

Yet another object of this invention is to provide a differential fluid amplifier comprising a fluid pressure comparator and a vortex amplifier, the vortex amplifier being coupled to the comparator for converting fluid pressure differentials in the comparator to velocity-amplified rotating fluid output signals.

Figure 3:
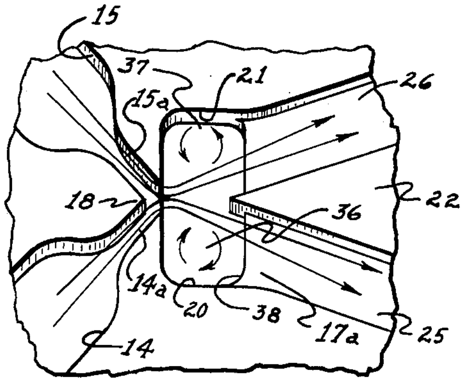
Figure 4:
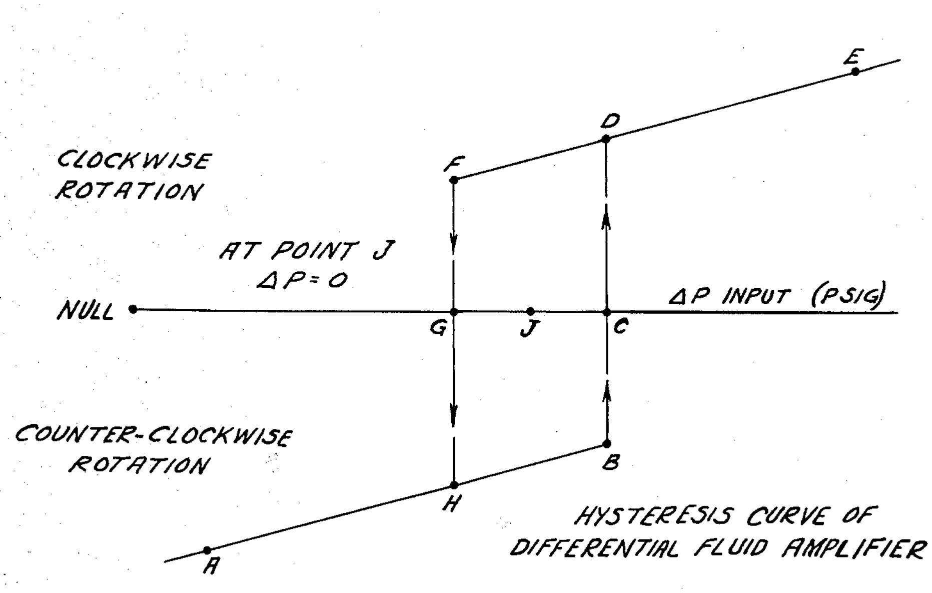

The above and still further objects, features and advantages of the present invention will become apparent upon consideration of the following detailed description of one specific embodiment thereof, especially when taken in conjunction with the accompanying drawings, wherein:

FIGURE 1 is a plan view of the fluid amplifier in accordance with this invention;

FIGURES 2*a*–2*f* illustrate flow patterns of fluid in the amplifier under various operating conditions;

FIGURE 3 is a plan view of a modification of the amplifier shown in FIGURE 1; and FIGURE 4 illustrates the residual hysteresis curve or loop of a typical fluid amplifier constructed in accordance with the principles of this invention.

Referring now to FIGURE 1 of the accompanying drawings for a more complete understanding of the invention, a differential fluid amplifier 10 comprises a fluid comparator 11 and a vortex amplifier 12 intercoupled as shown.

The amplifier 10 is formed in a flat plate 13 by molding, milling, casting or by other techniques which will form the necessary passages and cavities therein. The plate 13 may be composed of any material compatible with the fluid employed, and may, for example, be composed of metal, plastic, ceramic or other suitable material. The fluid employed may be gaseous or liquid or combinations thereof, and as a matter of convenience, air and water may be employed.

The plate 13 is covered with another flat plate, omitted for purposes of clarity, which is clamped or otherwise sealed to the plate 13, for instance, by machine screws, clamps, adhesives, or by any other suitable means. It is of primary importance, however, that the connection between the plates be fluid-tight so that the fluid flows only within the passages and cavities formed in the plate 13.

The fluid comparator 11 includes a pair of nozzles 14 and 15 which terminate in orifices **14*a* and 15*a*, respectively, the orifices communicating with an end wall 16 of a stream interaction chamber 17. The orifices 14*a* and 15*a* are preferably of equal cross-sectional areas and one side of each orifice 14*a* and 15*a* converges to form a common edge 18 located symmetrically with respect to side walls 20 and 21 of the interaction chamber 17. The side walls 20 and 21 are spaced remotely from the orifices 14*a* and 15*a* so that essentially no interaction and resulting lock-on occurs between the streams issuing from the nozzles 14 and 15 and the side walls 21 and 20, respectively. Located downstream of the orifices 15*a* and 16*a* is a flow divider 22 having the apex 23 thereof coincident with a center line CL symmetrically inscribed through the amplifier 10, the line CL also intersecting the edge 18 of the end wall 16. In the particular embodiment illustrated, the distance from the edge 18 to the apex 23 is approximately three orifice widths, the angle formed between the center line CL and a center line taken through the longitudinal axis of each nozzle 14 and 15 being 45°. Outlet flow passages 25 and 26 are defined between the side walls 20 and 21, extended, and the opposite sides of the diverging flow divider 22, respectively. The nozzles 14 and 15 are angularly positioned with respect to each other and with respect to the interaction chamber 17 so that the passages 25 and 26 receive fluid from the nozzles 15 and 14**, respectively, in the event there is flow from only one or the other of the nozzles.

The fluid vortex amplifier 12 includes a vortex chamber 28 defined by a substantially semi-circular peripheral chamber wall 30 which at diametrically opposed locations is preferably tangential respectively to extended side walls 20 and 21 defining the passages 25 and 26. An outlet orifice 31 of considerably smaller radius than the radius of the semi-circular vortex chamber 28 is located on the axis of symmetry through the vortex chamber 28. The chamber 28 may be of cylindrical or conical shape. As will be discussed in detail hereinafter, fluid flow from the outlet passages 25 and 26 assumes either a rotating or a non-rotating flow pattern in the vortex chamber 28 and egresses as a rotating or as non-rotating fluid flow, respectively, from the outlet orifice 31.

Fluid pressure signals are supplied to the amplifier 10 through inlet ducts or tubes 32 and 33 communicating with the nozzles 14, 15, respectively. Assume for the purpose of illustrating the functioning of a fluid pressure comparator that the fluid input signal supplied to the duct 33 is maintained at a constant reference pressure and that the duct 32 receives a variable or fluctuating pressure input signal. The fluctuating pressure signal may, for instance, be generated by conventional condition-responsive fluid devices such as a pressure bellows or a pivoting nozzle that supplies varying amounts of pressurized fluid to the duct 32 as determined by the angular position of the nozzle relative thereto.

Figure 2A:
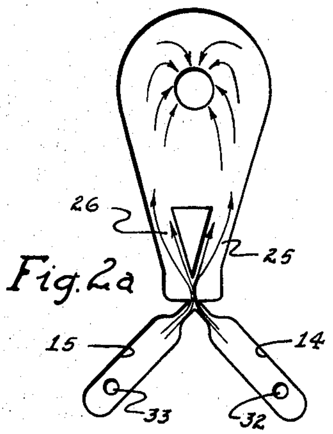

With reference to FIGURE 2*a*, it will be evident that when the fluctuating fluid pressure in the tube 32 equals the monitored pressure of fluid in the tube 33, the two streams 14 and 15 are mutually deflected by stream interaction through equal angles and combine to form a composite stream directed toward apex 23 along center line CL of the unit. The combined stream is divided equally by the divider 22 and flow into the vortex chamber 28 is symmetrical. Since the fluid flows entering the vortex chamber 28 are equal and opposite in direction, their forces in the chamber counterbalance one another so that there is no residual force to establish vortex rotation in the chamber. Consequently, the flow in the chamber is irrotational, and the fluid enters the outlet orifice 31 radially thereof and flows from the orifice 31 with little or no rotational velocity.

Figure 2B:
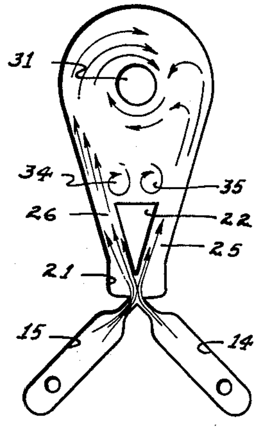

When the pressure of the fluid in the tube 32 becomes slightly greater than the reference pressure of fluid in the tube 33, the larger analog type of fluid signal issuing from the nozzle 14 deflects the stream from the nozzle 15 as shown in FIGURE 2*b*, toward the wall 21 and a small quantity of fluid from the nozzle 14 crosses the center line CL and enters the passage 26 along with all of the fluid from the nozzle 15. The additional fluid flow in the passage 26 produces asymmetrical flow patterns in the passages 25 and 26. The greater momentum of the fluid leaving the passage 26 overcomes the momentum of flow of fluid from the passage 25 and produces a resultant low velocity, clockwise, rotating flow, as indicated by the arrows in FIGURE 2*b*, about the orifice 31. The fluid from the passage 25 becomes entrained in the vortex so created and rotates therewith. Since the vortex initially rotates at a relatively large distance from the center of the orifice 31 as compared to the orifice radius, the velocity component of the vortex created by pressure differentials in the comparator 11 is amplified.

Small vortices referred to generally by the numerals 34 and 35 may also be created at the base of the flow divider 22, the effect of such vortices as shown in FIGURE 2*b* on the operation of the amplifier 10 being negligible. When the net tangential velocity of the flow in the chamber 28 is near null or zero, these two vortices 34 and 35 increase in size and assume essentially elongated symmetrical flow patterns which become part of the flow stream in the chamber 28 as shown in FIGURE 2*e*. Therefore a slight increase in the overall size of one vortex 34 or 35 relative to the other due to a slight differential in pressure between the nozzles 14 and 15 causes the larger vortex so created to dominate the flow pattern at the outlet orifice 31, as shown in FIGURE 2*f*, so that the rotating output from the orifice 31 is indicative of the slightly higher input pressure. In FIGURE 2*f*, the input pressure of nozzle 15 is shown to be higher by the counterclockwise rotation of the flow output.

Figure 2C:
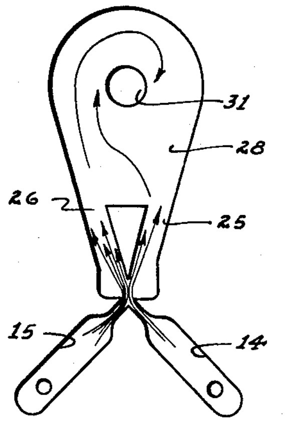

Referring now to FIGURE 2*c*, there is shown the asymmetrical fluid flow pattern which results in the passages 24 and 25 and in the vortex chamber 28 when the pressure of the fluid supplied to the monitored nozzle 14 is considerably in excess of reference pressure in the nozzle 15. As shown in that figure, the fluid stream issuing from the nozzle 14 crosses the center line CL against the pressure applied by the stream from the nozzle 15 and forces a considerable quantity of its fluid into the passage 26, the remainder of fluid flow issuing from the passage 25 and flowing around the base of the flow splitter 22 to become entrained in, and reinforces the clockwise vortex established by flow from the passage 26 in the vortex chamber 28. The vortex so generated has a relatively large initial velocity that is amplified in the chamber 28, and issues from the orifice 31 as a clockwise rotating output signal.

Figure 2D:
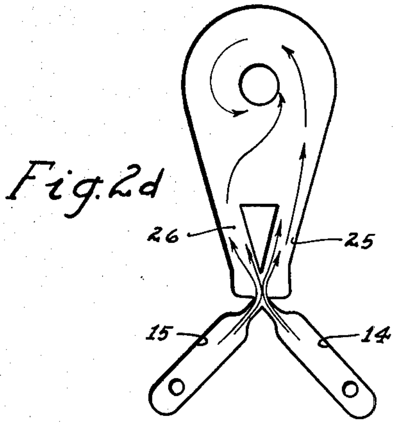
Figure 2E:
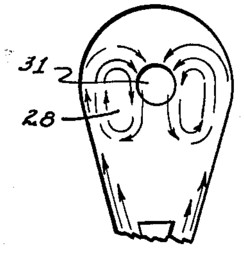
Figure 2F:
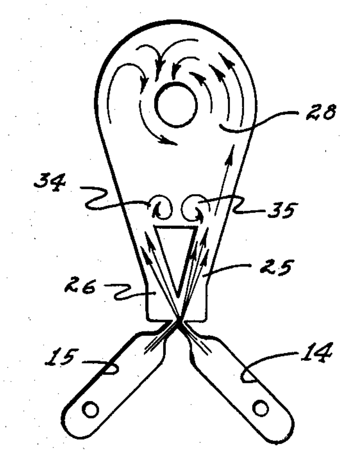

FIGURE 2*d* illustrates the flow pattern in the amplifier 10 when the monitored pressure causing flow from the nozzle 14 is significantly less than that of the reference pressure in the nozzle 15. The vortex flow pattern egressing from the orifice 31 is opposite in direction to that which is generated when the pressure in the nozzle 14 is significantly greater than that in the nozzle 15 (FIGURE 2*b*), the counterclockwise vortex generated in the vortex chamber 28 resulting from the deflection of essentially all of the fluid from the nozzle 14 into the passage 25 as well as the addition of a small quantity of fluid from the deflecting stream.

The effects of diameter of the egress orifice 31 on the flow in the chamber 28 may be seen by referring again to FIGURE 1 of the accompanying drawings. It is assumed that the flow in the passage 26 is very slightly greater than in the passage 25. These conditions result in the establishment of a weak residual pressure in the clockwise direction tending to establish vortical flow. The radial flow rate, however, is sufficiently greater than the circumferential flow whereupon the fluid is rapidly drawn toward the orifice 31 with a slightly larger proportion of the fluid following a path on the lower side of the orifice as indicated by the arrows 40. If the orifice is of such a size that substantially all of the fluid from the passage 26 that passes over the center line CL enters the orifice 31 directly, this condition being illustrated by flow lines 41 in FIGURE 1, then flow to the orifice is substantially non-rotating. In the latter instance, if, however, the diameter of the orifice 31 is made sufficiently small so that a large portion of the flow represented by lines 40 passes downstream of the orifice, then rotating flow can be established. Thus, the diameter of the orifice 31 has a decided effect on the type of flow that egresses from the orifice 31.

The tangential velocity of the fluid issuing from the amplifier 10 is a function of the pressure differentials between the interacting streams, the greater the differential in pressure between the monitored fluid signal and the reference fluid signal, the greater the rate of rotation of the fluid egressing from the orifice 31.

Referring now specifically to FIGURE 3 of the accompanying drawings, there is illustrated a modification of the apparatus illustrated in FIGURE 1. Discussing first the need for modification, a stream of fluid in flowing through an enclosed region entrains fluid on both sides of the stream and tends to reduce the pressure on each side as a result of the extraction of fluid due to entrainment. If the streams issuing from the orifices 14a and 15a are of equal characteristics and the resulting combined stream divides equally on the apex of the divider 22 then the stream of fluid is equally effective in removing fluid from both sides thereof so that any reduction in pressure on the two side walls is equal. However, if the two input streams are of different pressure the combined stream will be deflected toward one side wall rather than the other, for instance, closer to the side wall 20 than the side wall 21. Due to the fact that the region 36 that results between the stream and the side wall 22 becomes smaller than the corresponding region 37 on the other side of the stream, the pressure in the region 36 is reduced to a greater extent than the pressure in the region 37. This results in a differential in pressure across the combined stream which so far as the apparatus is concerned, has the same effect as a differential in pressure between the two input flows. In consequence, the apparatus cannot go through null directly when the flows from the two orifices are equal since the differential in pressure created by the stream being closer to one side wall than the other must also be overcome.

This effect is illustrated by the curve in FIGURE 4, this curve representing a residual hysteresis curve of the fluid amplifier 10 shown in FIGURE 1. The residual hysteresis characteristic of the unit 10 is obtained by plotting output rotational direction as a function of pressure differentials between the fluid issuing from the nozzles 14 and 15. Assume initially that the fluid is issuing only from the nozzle 15 and therefore the stream is directed entirely to the output passage 25, this condition being indicated by point A. As fluid under pressure is supplied to the nozzle 14 and the pressure thereof is gradually increased, the combined stream begins to swing back towards the apex of the divider 22 and follows a slope as indicated by the line AB which slope is determined in part by the differential in pressure established across the main stream as a result of greater evacuation of the region 37 than the region 36 of FIGURE 3. In consequence of this differential in pressure, the unit 10 switches output rotating direction from B to D. This is a step or abrupt change in the rotating direction of fluid egressing from the orifice 31 that occurs when the point B is reached. The point C on the line BD represents a null point passed through during the switching of the output flow direction. The point J is taken as the true null point, that is the point where $\Delta$ P equals zero, and the length of the line CJ includes a pressure differential which is partially due to the fluid that is trapped under relatively low pressure between the fluid stream and the side wall. The D–E portion of the hysteresis curve corresponds to the condition where substantially all flow has now been switched into an opposite output passage, passage 25 in FIGURE 1, so that further increases in pressure produce an increase in flow only to the extent that the increased pressure increases the fluid supplied to the unit 10.

If the differential in pressure is thereafter incrementally reduced the curve retraces itself to the point D and then continues to the point F. As a result of further decreasing the differential in pressure of the nozzles 14 and 15, the slope of the curve D–F changes abruptly at the point F and an abrupt switch in flow direction occurs as indicated by the line F–H, the point H being essentially concident with the point A. The point G represents a condition corresponding to the point C where the pressures in both nozzles 14 and 15 are equal.

The length of the line G–J is equal to the length of the line C–J and correspondingly the line G–J indicates the pressure differential that results partially from the fluid trapped between the fluid stream and the side wall 21 of the interaction chamber 17.

The particular hysteresis curve of FIGURE 4 shows a condition where a null exists over a less than 2 percent fluctuation in pressures between the input signals. The distance between the points C and J or between the points G and J is known to those working in the art as the differential gap of the system. In this particular case, the unit 10 would therefore have a differential gap of less than 1 percent. Thus, a 1 percent change in pressure would be required in this unit to switch from a null condition to a rotating condition.

In the modified form of the device illustrated in FIGURE 3, the differential in pressure across the stream due to the evacuation of the regions 36 and 37 is overcome by providing a region 38 of increased depth which permits the pressures on the opposite sides of the stream to equalize. More specifically, the depression 38 is equal to about one orifice depth and is arranged downstream of the initial point of interaction between the streams in the interaction region of the streams issuing from the nozzles 14 and 15. Fluid may then flow under the combined stream between the regions 36 and 37 so that the pressures therein are always maintained equal and no differential in pressure can be established across the combined stream due to the evacuation effects. The region 38 is located downstream of the initial point of interaction between the streams in the region of interaction between the fluid streams so that the streams do not flow around one another prior to momentum exchange therebetween.

The recessed region 38 does not eliminate all residual hysteresis effects in the vortex amplifier but does greatly reduce such effects. As will be discussed subsequently other effects in the amplifier introduce some hysteresis although the amount of residual hysteresis in a unit such as illustrated in FIGURE 3 is relatively small.

It is important to note that interaction between the fluid streams issuing from the nozzles 14 and 15 in the embodiments shown in both FIGURES 1 and 3 is made to occur while both streams are constricted by the nozzle orifices. Thus, the streams are made to interact prior to diverging into the interaction chamber.

The length of the differential gap of the hysteresis curve is also related to the distance that the apex 23 of the flow divider 22 is from the edge 18 in the embodiments illustrated in FIGURES 1 and 3. It has been observed that optimum low hysteresis characteristics can be obtained when the apex 23 is positioned approximately 2.8 orifice widths downstream of the edge 18. The length of the flow divider 22 is not critical so long as the length of the divider is not so great that the flow pattern in the chamber 28 is impaired.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In combination, a vortex chamber including a peripheral wall and an orifice for egress of fluid from said vortex chamber, said orifice located centrally with respect to said peripheral wall and having a radius substantially less than the radius of said wall, and means for supplying opposed fluid streams to said chamber, said means being directed so that each of said streams is discharged into said chamber eccentrically of said orifice so as to create a vortical flow pattern in respective opposite senses at said orifice whereby, the rotational velocity and direction of the vortical rotation from said orifice is a function of the differentials in pressure between the fluid streams entering said chamber, said fluid streams being the only fluid supplied to said chamber.

2. In a fluid vortex system, a cylindrical chamber of relatively large radius, said chamber having at least one axial egress orifice therein through which fluid can issue, a fluid pressure comparator for comparing pressure differences between first and second fluid streams, said comparator being directed so as to discharge each stream to an opposite side of said chamber eccentrically of said orifice in the absence of the other stream so as to create a vortical flow pattern in respective opposite senses at said orifice, and in the presence of both streams issuing quantities of fluid to opposite sides of said chamber which vary as a function of the relative magnitudes of the pressures of the streams, asymmetrical flows to opposite sides of said chamber imparting rotation to fluid in said chamber.

3. A fluid vortex system comprising a chamber, the peripheral wall of said chamber having a relatively large radius and at least one fluid egress orifice of relatively small radius located centrally of said chamber, means for supplying a plurality of streams to opposite sides of said chamber in respective opposite senses and at relatively large radii with respect to said orifice, means for establishing said streams with mass flow rates which are functions of a differential fluid pressure to be measured, said means being so directed so that each of said streams is discharged into said chamber eccentrically of said orifice whereby the vortical direction and velocity of flow from said orifice is determined by the mass flow rates of said streams, said fluid streams being the only fluid supplied to said chamber.

4. A fluid amplifier comprising a fluid pressure comparator for comparing the pressures between a monitored fluid input signal and a standard fluid input signal, a vortex chamber for velocity amplifying vortices generated therein, said chamber including an orifice therein for egress of fluid from said chamber, said orifice located centrally of said chamber and having a radius substantially less than the radius of said chamber, and means connecting said comparator to said chamber so as to issue generally opposed fluid streams into said chamber eccentrically of said orifice, each of said streams being discharged into said chamber so that flow from said comparator creates a vortical flow pattern in respective opposite senses at said orifices whereby the rotational velocity and the direction of rotation of the vortex so created is a function of the pressure differential between the fluid input signals.

5. A fluid amplifier comprising a fluid comparator including a stream interaction chamber and a plurality of nozzles angularly disposed with respect to each other for issuing interacting fluid streams into said interaction chamber, plural passages located downstream of said interaction chamber for receiving flow therefrom, the portion of stream flow received by each passage being determined by the differentials in pressure between the interacting streams in said interaction chamber, a fluid vortex chamber for imparting rotary motion to fluid flowing therein, said vortex chamber having an axis of symmetry and an outlet orifice of relatively small cross-sectional area located on the axis, said passages being connected to said chamber to discharge streams of fluid into said chamber which oppose one another in said chamber, said streams of fluid entering said chamber at relatively large distances from the axis thereof and eccentrically of said orifice so as to create a vortical flow pattern in respective opposite senses at said orifice whereby the rotational velocity and direction of rotational flow from said orifice is determined by the relative momenta of the streams entering said vortex chamber from said passages.

6. A fluid amplifier comprising a stream interaction chamber formed by an end wall and a pair of diverging side walls connected to said end wall, a plurality of nozzles angularly disposed with respect to each other for issuing fluid streams into said interaction chamber in mutually deflecting relationship, a channel extending transversely of said chamber between said side walls and in the region of interaction between said fluid streams for equalizing pressures that may be developed between the interacting fluid streams and said side walls, and a vortex chamber coupled to said interaction chamber for velocity amplification of asymmetrical fluid streams issuing from said interaction chamber.

7. A fluid pressure comparator comprising a stream interaction chamber formed by an end wall and a pair of diverging side walls connected to said end wall, a plurality of nozzles angularly disposed with respect to each other for issuing fluid streams into said interaction chamber in mutually deflecting relationship, a channel extending transversely of said chamber between said side walls and in the region of interaction between said fluid streams for equalizing pressures that may be developed between the interacting fluid streams and said side walls, plural passages located downstream of said chamber for receiving fluid flowage therefrom, the portion of fluid flowage into each passage being a function of the pressure differentials developed between the mutually deflecting streams.

8. The fluid comparator as claimed in claim 7, wherein said side walls and said nozzles are symmetrical with respect to a center line taken through said comparator.

9. The fluid comparator as claimed in claim 7, wherein said side walls are located remote from the orifices formed by said nozzles in said end wall so that substantially no lock on occurs between the deflected streams and said side walls forming said chamber.

10. The fluid comparator as claimed in claim 8, wherein the orifices formed by said nozzles terminate to form an edge disposed transversely of said chamber, said edge coinciding with the center line.

References Cited by the Examiner

UNITED STATES PATENTS

| | | | |
|---|---|---|---|
| 1,517,598 | 12/24 | Stevenson | 137—604 |
| 3,075,227 | 1/60 | Bowles | 15—346 |

LAVERNE D. GEIGER, *Primary Examiner.*

WILLIAM F. O'DEA, *Examiner.*